United States Patent [19]

Cliffton et al.

[11] Patent Number: 4,988,796

[45] Date of Patent: Jan. 29, 1991

[54] PROCESS FOR PREPARING POLY(ARYLENE SULFIDE SULFONE)

[75] Inventors: Michael D. Cliffton, Kingsport, Tenn.; Jon F. Geibel, Bartlesville, Okla.

[73] Assignee: Phillips Petroleum Company, Bartlesville, Okla.

[21] Appl. No.: 481,529

[22] Filed: Feb. 20, 1990

[51] Int. Cl.$^5$ .............................................. C08G 75/20
[52] U.S. Cl. .................................. 528/388; 528/171; 528/174
[58] Field of Search ....................... 528/388, 171, 174

[56] References Cited

U.S. PATENT DOCUMENTS

| | | | |
|---|---|---|---|
| 3,919,177 | 11/1975 | Campbell | 260/79.1 |
| 4,016,145 | 4/1977 | campbell | 260/79.3 M |
| 4,102,875 | 7/1978 | Campbell | 528/388 |
| 4,301,274 | 11/1981 | Campbell | 528/388 |
| 4,808,698 | 2/1989 | Bobsein et al. | 528/388 |

Primary Examiner—Harold D. Anderson
Attorney, Agent, or Firm—Kenneth D. Goetz

[57] ABSTRACT

A process for preparing poly(arylene sulfide sulfone) by contacting a dihaloaromatic sulfone, an organic amide, a sulfur-containing compound selected from the group consisting of alkali metal bisulfides, hydrogen sulfide and N-methyl-2-pyrrolidinethione, water, and an alkali metal carboxylate.

13 Claims, No Drawings

PROCESS FOR PREPARING POLY(ARYLENE SULFIDE SULFONE)

BACKGROUND OF THE INVENTION

This invention relates to the production of poly(arylene sulfide sulfone)s. In one aspect, this invention relates to the production of poly(phenylene sulfide sulfone).

Poly(arylene sulfide sulfone)s are engineering thermoplastics of potential commercial interest for film, fiber, molding, and composite applications because of their high glass transition temperatures and chemical resistance.

General processes for the production of poly(arylene sulfide sulfone)s are known. U.S. Pat. No. 4,016,145 discloses the production of poly(arylene sulfide sulfone)s by the reaction of a dihaloaromatic sulfone, such as bis(4-chlorophenyl)sulfone, with an alkali metal sulfide in the presence of an alkali metal carboxylate and an organic amide. U.S. Pat. No. 4,301,274 discloses the production of poly(arylene sulfide sulfone)s by the reaction of a dihaloaromatic sulfone, such as bis(4-chlorophenyl)sulfone, with an alkali metal sulfide in the presence of an organic amide and optionally an alkali metal carboxylate, wherein the alkali metal sulfide can be produced by reacting an alkali metal bisulfide as the sulfur source with an alkali metal hydroxide as the base. Although these patents represent significant and valuable advances in the art, there is a need for a process which can provide poly(arylene sulfide sulfone)s without the problems associated with; using alkali metal sulfides. For example, use of alkali metal sulfides results in increased corrosion in the polymerization and/or alkali metal sulfide reactors if alkali metal sulfide is prepared from alkali metal bisulfide and alkali metal hydroxide. In accordance with the invention, use of alkali metal carboxylate, in which is believed to function as the base, results in much milder reaction conditions which should reduce corrosion.

SUMMARY OF THE INVENTION

It is an object of the invention to provide a process for producing high molecular weight poly(arylene sulfide sulfone) by using an alkali metal carboxylate which is believed to function as the base. It is a further object of the invention to provide a process for producing poly(arylene sulfide sulfone) having reduced corrosion by using an alkali metal carboxylate.

According to the invention, a process for preparing poly(arylene sulfide sulfone)s is provided which comprises contacting at least one dihaloaromatic sulfone, at least one organic amide, at least one sulfur-containing compound which requires the presence of at least one base, water, and at least one alkali metal carboxylate. It is believed that the alkali metal carboxylate functions as the base in the polymerization process.

DETAILED DESCRIPTION OF THE INVENTION

This invention relates to a process for preparing poly(arylene sulfide sulfone) polymers comprising contacting: (a) at least one dihaloaromatic sulfone, (b) at least one organic amide, (c) at least one sulfur-containing compound selected from the group consisting of alkali metal bisulfides, hydrogen sulfide, and N-methyl-2-pyrrolidinethione, (d) water, and (e) at least one alkali metal carboxylate. The poly(arylene sulfide sulfone)s made according to this invention are readily recoverable and well suited for use in applications such as film, fiber, molding, and composites. The poly(arylene sulfide sulfone)s made according to the invention have sufficiently high molecular weight, as measured by melt flow, that they can be used directly in such applications without the need for a curing step to increase molecular weight.

Melt flow is a measurement of molecular weight which is particularly useful in characterizing poly(arylene sulfide sulfone)s. It is generally considered that melt flow is inversely related to molecular weight for polymeric materials in general and for poly(arylene sulfide sulfone)s in particular. As used herein, the term "melt flow" refers to polymer flow rates in grams per 10 minutes measured according to ASTM D1238-86 using condition 343/5.0 modified to use a 5-minute preheat time.

Dihaloaromatic sulfones employed in the process of the invention can be represented by the formula

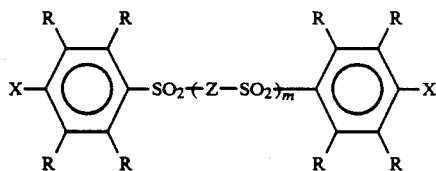

wherein each X is selected from the group consisting of fluorine, chlorine, bromine, and iodine, Z is a divalent radical selected from the group consisting of

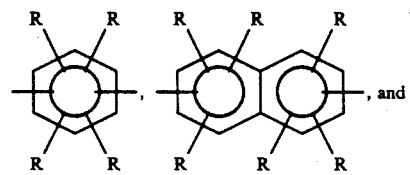, and

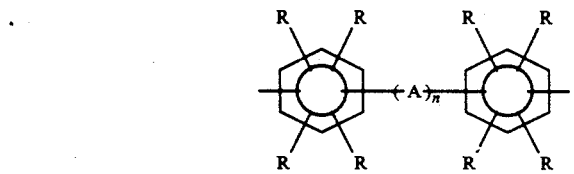

wherein m is 0 or 1, n is 0 or 1, A is selected from the group consisting of oxygen, sulfur, sulfonyl, and $CR_2$, wherein each R is selected from the group consisting of hydrogen and alkyl radicals having to about 4 carbon atoms, the total number of carbon atoms in all of the R groups in the molecule being 0 to about 12. Preferably, if m is 0 the dihaloaromatic sulfone of the invention is represented by the formula

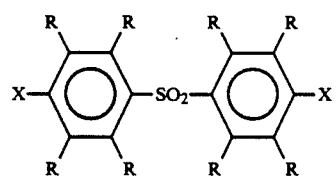

and if m is 1, n is 0 and the dihaloaromatic sulfone of the invention is represented by the formula

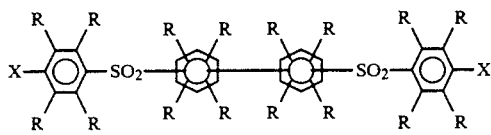

wherein each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups in the molecule being 0 to about 12.

Examples of some dihaloaromatic sulfones that can be employed in the process of the invention include bis(4-fluorophenyl)sulfone, bis(4-chlorophenyl)sulfone, bis(4-bromophenyl)sulfone, bis(4-iodophenyl)sulfone, p-chlorophenyl p-bromophenyl sulfone, p-iodophenyl 3-methyl-4-fluorophenyl sulfone, bis(2-methyl-4-chlorophenyl)sulfone, bis(2,5-diethyl-4-bromophenyl)sulfone, bis(3-isopropyl-4-iodophenyl)sulfone, bis(2,5-dipropyl-4-chlorophenyl)sulfone, bis(2-butyl-4-fluorophenyl)sulfone, bis(2,3,5,6-tetramethyl-4-chlorophenyl)sulfone, 2-isobutyl-4-chlorophenyl 3-butyl-4-bromophenyl sulfone, 1,4-bis(p-chlorophenyl sulfonyl)benzene, 1-methyl-2,4-bis(p-fluorophenyl sulfonyl)benzene, 2,6-bis(p-bromophenyl sulfonyl)napthalene, 7-ethyl-1,5-bis(p-iodophenyl sulfonyl)napthalene, 4,4'-bis(p-chlorophenyl sulfonyl)biphenyl, bis[p-(p-bromophenyl sulfonyl)phenyl]ether, bis[p-(p-chlorophenyl sulfonyl)phenyl]sulfide, bis[p-(p-chlorophenyl sulfonyl)phenyl]sulfone, bis[p-(p-bromophenyl sulfonyl)phenyl]methane, 5,5-bis[3-ethyl-4-(p-chlorophenyl sulfonyl)phenyl]nonane, and the like, and mixtures thereof. The presently preferred dihaloaromatic sulfone is bis(4-chlorophenyl)sulfone because of its effectiveness and commercial availability.

The amount of dihaloaromatic sulfone employed in the invention depends upon the amount of sulfur-containing compound employed. The amount of dihaloaromatic sulfone can be expressed in terms of a molar ratio of dihaloaromatic sulfone to sulfur-containing compound and will generally be about 0.7:1 to about 1.3:1. Preferably, this molar ratio is about 0.9:1 to about 1.15:1.

The organic amides used in the process of the invention should be substantially liquid at the reaction temperature and pressure employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N-ethyl-2-pyrrolidone, N-cyclohexyl-2-pyrrolidone, N-dodecyl-3-octyl-2-pyrrolidone, N,N'-ethylenedi-2-pyrrolidone, hexamethylphosphoramide, and the like, and mixtures thereof.

The amounts of organic amide employed according to the invention can be expressed in terms of molar ratio based on the sulfur-containing compound employed. Broadly the molar ratio of organic amide to sulfur-containing compound will be about 2:1 to about 24:1, preferably about 4:1 to about 16:1. N-methyl-2-pyrrolidone is especially preferred because of excellent results and ready availability.

In accordance with the invention, suitable sulfur-containing compounds which can be employed in the production of the poly(arylene sulfide sulfone)s can be selected from the group consisting of alkali metal bisulfides, hydrogen sulfide and N-methyl-2-pyrrolidinethione. Suitable alkali metal bisulfides include lithium bisulfide, sodium bisulfide, potassium bisulfide, rubidium bisulfide, cesium bisulfide, and mixtures thereof. Sodium bisulfide is preferred because of ready availability and good results obtained therewith. The alkali metal bisulfide can conveniently be utilized in the process of the invention as an aqueous solution. For example, an aqueous solution of sodium bisulfide having about 60 weight percent sodium bisulfide is convenient to use.

The amount of water employed according to the invention can be expressed in terms of molar ratio based on the organic amide employed. Broadly, the molar ratio of organic amide to water will be from about 0.4:1 to about 2:1, preferably about 0.45:1 to about 1.6:1, and most preferably about 0.5:1 to about 1.3:1.

Alkali metal carboxylates that can be employed in the process of the invention can be represented by the formula $R'CO_2M$ where $R'$ is a hydrocarbyl radical selected from alkyl, cycloalkyl, aryl and combinations thereof such as alkaryl, aralkyl, and the like. The number of carbon atoms in said $R'$ is within the range of about 1 to about 20 and M is an alkali metal selected from lithium, sodium, potassium, rubidium, and cesium.

Examples of some alkali metal carboxylates that can be employed in the process of the invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyl octanoate, potassium dodecanoate, rubidium 4-ethyl tetradecanoate, sodium octadecanoate, sodium heneicosanoate, lithium cyclohexane carboxylate, cesium cyclododecane carboxylate, sodium 3-methyl cyclopentane carboxylate, potassium cyclohexylacetate, potassium benzoate, lithium benzoate, sodium benzoate, potassium m-toluate, lithium phenyl acetate, sodium 4-phenyl cyclohexane carboxylate, potassium p-tolyl acetate, lithium 4-ethyl cyclohexyl acetate and the like and mixtures thereof. The presently preferred alkali metal carboxylate is sodium acetate because of its effectiveness and commercial availability.

According to the invention, the alkali metal carboxylate employed is believed to function as the base for the sulfur-containing compound employed which requires the presence of at least one base. The amount of alkali metal carboxylate employed according to the invention can be expressed in terms of molar ratio based on the sulfur-containing compound employed. Broadly, the molar ratio of alkali metal carboxylate to sulfur-containing compound will be from about 0.5:1 to about 4:1, preferably about 0.9:1 to about 2:1, and most preferably about 0.95:1 to about 1.05:1.

The charge sequence of the various compounds employed in the process of the invention can be varied as desired. One convenient method is to simply charge all the compounds in any desired sequence to a suitable reaction vessel equipped with agitation means at about room temperature and then to heat the mixture with stirring to the desired reaction temperature and to hold the mixture for the desired length of time at said temperature. It is also possible to preheat a mixture of only certain of the compounds in a separate vessel then to charge this mixture to the preheated mixture of the remainder of the compounds in the reaction vessel. Although the reaction temperature at which the polymerization is conducted can vary over a considerable range, generally it will be within the range of about 120° C. to about 240° C., preferably about 185° C. to about 225° C. The reaction time can vary widely, depending in part on the reaction temperature employed, but generally will be within the range of about 10 minutes to about 72 hours, preferably about 1 hour to about 4 hours. The pressure should be sufficient to maintain the dihaloaromatic sulfone and other organic and inorganic compounds present substantially in the liquid phase.

The poly(arylene sulfide sulfone)s as produced by the process of the invention are in particle form and can be separated from the reaction mixture by conventional procedures, e.g. by filtration of the reaction mixture to recover the polymer followed by washing at least once with water. A presently preferred recovery method involves diluting the hot reaction mixture with a mixture of water and organic amide and cooling the diluted mixture while stirring. The separated polymer particles can then be washed with water preferably with at least a portion of the washing being conducted at an elevated temperature within the range of about 120° C. to about 250° C. and then dried to provide a polymer which is low in ash-forming substances and is relatively light in color as well as exhibiting good melt flow stability under conditions of melt processing operations such as injection molding. During the above-described treatment of the recovered poly(arylene sulfide sulfone), an elevated temperature wash using alkali metal hydroxide, e.g. sodium hydroxide, followed by an elevated temperature wash using a calcium salt, e.g. calcium chloride or calcium acetate, is employed in the above-described elevated temperature washing steps. Alternately, it is presently preferred to employ a zinc carboxylate salt in the treatment of the recovered poly(arylene sulfide sulfone) in at least one of the above-described elevated temperature washing steps.

The poly(arylene sulfide sulfone)s produced by the process of the invention can be blended with fillers, fibers, pigments, extenders, other polymers and the like. The poly(arylene sulfide sulfone)s can be cured to provide cured products having high thermal stability and good chemical resistance, wherein curing is defined as a distinct process step after polymer drying comprising a thermal treatment of the polymer in the presence of an oxygen-containing atmosphere. The preferred oxygen-containing atmosphere is air. The poly(arylene sulfide sulfone)s of the invention are useful in the production of film, fibers, molded objects, and composites.

EXAMPLES

EXAMPLE I

A series of polymerization runs were performed in a two gallon, fast-stirring reactor for the preparation of poly(phenylene sulfide sulfone) (PPSS). The polymerization recipe for these runs is presented below.

| | Compound, g-mole |
|---|---|
| Bis(4-chlorophenyl)sulfone (BCPS) | 2.01–4.02 |
| Sodium bisulfide (NaSH)[a] | 2.01–4.04 |
| N-methyl-2-pyrrolidone (NMP) | 16.1–20.2 |
| Water ($H_2O$)[b] | 6.0 |

-continued

| | Compound, g-mole |
|---|---|
| Sodium acetate (NaOAc) | 0–4.2 |

[a] Charged as a solid NaSH—$H_2O$ solution containing 59.2 weight percent NaSH.
[b] Does not include $H_2O$ present in NaSH.

In each run the reactor was charged with BCPS, NaSH, NMP, $H_2O$ and optionally NaOAc. The reactor was sealed, agitation started and deoxygenating accomplished by three pressurize-release cycles using nitrogen. The polymerization temperature profile used is as follows: (1) increase temperature to 120° C. and hold for one hour, (2) increase temperature to 160° C. and hold for 45 minutes, (3) increase temperature to 190° C. and hold for 15 minutes, and (4) increase temperature to 195° C. and hold for 2 hours. At this time, heating was terminated and the reaction mixture cooled slowly.

The PPSS reaction mixture was removed from the reactor and placed in a Waring blender. The polymer in the reaction mixture was then ground in the Waring blender and the reaction mixture filtered. The polymer was then reslurried/filtered 3 times with 80°–100° C. tap water. The filter cake from the final wash was then charged to the reactor with 3000 mL deionized water and 30 grams of sodium hydroxide (NaOH) pellets. The reactor was sealed, agitation started and deoxygenating accomplished by three pressurize-release cycles using nitrogen. The temperature of the slurry was raised to 120° C. and the slurry cooled. The slurry was then filtered and the filter cake rinsed with several volumes of ambient temperature deionized water. The filter cake was charged to the reactor with 3000 mL deionized water and 150 grams of calcium chloride ($CaCl_2$). The reactor was sealed, agitation started and deoxygenating accomplished by three pressurize-release cycles using nitrogen. The temperature of the slurry was raised to 185° C., held for 30 minutes, and then cooled. The slurry was filtered and the filter cake rinsed with several volumes of ambient temperature deionized water. The filter cake was then rinsed with acetone, dried in a forced air oven, and a sample tested for melt flow.

The results obtained are presented in Table I.

TABLE I

| Run No. | Molar Ratios | | | | Melt Flow, g/10 min. |
|---|---|---|---|---|---|
| | NaOAc/ NaSH | NMP/ NaSH | NMP/ $H_2O$[a] | NaSH/BCPS | |
| 1 | 1.04 | 8 | 1.56 | 1.005 | 4.1 |
| 2 | 1.04 | 4 | 1.10 | 1.005 | 0 |
| 3 | 1.04 | 10 | 1.95 | 1.005 | 17.8 |
| 4 | 1.05 | 8 | 1.56 | 1.0 | 74.5 |
| 5[b] | 0.0 | 8 | 1.56 | 1.0 | —[c] |

[a] Includes $H_2O$ present in NaSH.
[b] Control run.
[c] No recoverable polymer was obtained. The product was a thin black liquid possessing a strong odor.

The results in Table I indicate that PPSS having high molecular weight, as measured by melt flow, can be obtained using sodium acetate as the sole base whereas no recoverable PPSS is obtained when no sodium acetate is used (Runs 1–4 versus Run 5).

Runs 1–3 compare the effect of varying the polymerization concentration, i.e. varying the NMP/NaSH mole ratio. The polymer produced at the higher concentration, i.e. lower NMP/NaSH mole ratio, (Run 2) resulted in a higher molecular weight polymer than in Run 1 as evidenced by the lower melt flow. The polymer in Run 2 has a melt flow of zero indicating that the molten polymer was so viscous that it would not flow out of the melt flow apparatus. The polymer produced at the lower concentration, i.e. higher NMP/NaSH mole ratio, (Run 3) resulted in a lower molecular weight polymer than in Run 1 as evidenced by the higher melt flow.

Runs 1 and 4 compare the effect on molecular weight of varying the NaSH/BCPS mole ratio. Decreasing the NaSH/BCPS mole ratio (Run 4) results in a lower molecular weight polymer than in Run 1 as evidenced by the higher melt flow.

Therefore, the results indicate that good results can be obtained using alkali metal carboxylate as the sole base in a poly(arylene sulfide sulfone) polymerization. In addition, the results indicate that alkali metal carboxylate can be used effectively as the sole base in a poly(arylene sulfide sulfone) polymerization under a variety of stoichiometric conditions.

That which is claimed is:

1. A process for the production of poly(arylene sulfide sulfone) comprising contacting:
   (a) at least one dihaloaromatic sulfone,
   (b) at least one organic amide,
   (c) at least one sulfur-containing compound selected from the group consisting of alkali metal bisulfides, hydrogen sulfide and N-methyl-2-pyrrolidinethione,
   (d) water, and
   (e) at least one alkali metal carboxylate.

2. A process according to claim 1 wherein said alkali metal carboxylate is represented by the formula R'CO₂M wherein R' is a hydrocarbyl radical containing 1 to about 20 carbon atoms, and M is an alkali metal.

3. A process according to claim 2 wherein the molar ratio of said alkali metal carboxylate to said sulfur-containing compound is about 0.5:1 to about 4:1.

4. A process according to claim 3 wherein the molar ratio of said alkali metal carboxylate to said sulfur-containing compound is about 0.9:1 to about 2:1.

5. A process according to claim 3 wherein the molar ratio of said dihaloaromatic sulfone to said sulfur-containing compound is about 0.7:1 to about 1.3:1.

6. A process according to claim 5 wherein the molar ratio of said organic amide to said sulfur-containing compound is about 2:1 to about 24:1.

7. A process according to claim 6 wherein the molar ratio of said organic amide to said water is about 0.4:1 to about 2:1.

8. A process according to claim 7 wherein said dihaloaromatic sulfone is represented by the formula

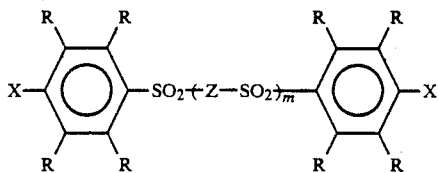

wherein each X is selected from the group consisting of fluorine, chlorine, bromine and iodine, Z is a divalent radical selected from the group consisting of

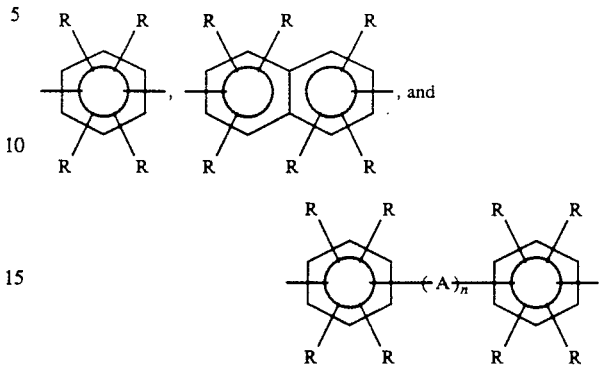

m is 0 or 1, n is 0 or 1, A is selected from the group consisting of oxygen, sulfur, sulfonyl, and CR₂, wherein each R is selected from the group consisting of hydrogen and alkyl radicals having 1 to about 4 carbon atoms, the total number of carbon atoms in all of the R groups in the molecule being 0 to about 12.

9. A process according to claim 8 wherein said organic amide is selected from the group consisting of cyclic and acyclic organic amides having 1 to about 10 carbon atoms per molecule.

10. A process according to claim 9 wherein said alkali metal carboxylate is sodium acetate.

11. A process according to claim 10 wherein m is 0 and said dihaloaromatic sulfone is represented by the formula

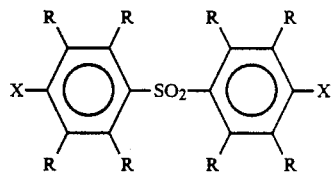

wherein each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups in the molecule being 0 to about 12.

12. A process according to claim 11 wherein said poly(arylene sulfide sulfone) is poly(phenylene sulfide sulfone).

13. A process for the production of poly(phenylene sulfide sulfone) comprising contacting:
   (a) bis(4-chlorophenyl)sulfone,
   (b) N-methyl-2-pyrrolidone,
   (c) sodium bisulfide,
   (d) water, and
   (e) sodium acetate.

* * * * *